(12) United States Patent
Fukuda et al.

(10) Patent No.: US 7,473,736 B2
(45) Date of Patent: *Jan. 6, 2009

(54) THERMOPLASTIC ELASTOMER COMPOSITION

(75) Inventors: Ryuji Fukuda, Osaka (JP); Hironari Nakabayashi, Osaka (JP); Taizo Aoyama, Hyogo (JP)

(73) Assignee: Kaneka Corporation, Osaka (JP)

( * ) Notice: Subject to any disclaimer, the term of this patent is extended or adjusted under 35 U.S.C. 154(b) by 283 days.

This patent is subject to a terminal disclaimer.

(21) Appl. No.: 10/536,508

(22) PCT Filed: Dec. 24, 2002

(86) PCT No.: PCT/JP02/13419

§ 371 (c)(1),
(2), (4) Date: May 25, 2005

(87) PCT Pub. No.: WO2004/058879

PCT Pub. Date: Jul. 15, 2004

(65) Prior Publication Data

US 2006/0079641 A1     Apr. 13, 2006

(51) Int. Cl.
*C08L 53/00* (2006.01)
(52) U.S. Cl. .......................... 525/95; 525/96
(58) Field of Classification Search ............ 525/95, 525/96
See application file for complete search history.

(56) References Cited

U.S. PATENT DOCUMENTS

| 6,140,418 A * | 10/2000 | Yamashita et al. ............ 525/88 |
| 6,773,758 B2 * | 8/2004 | Yamanaka ............... 427/407.1 |
| 7,105,611 B2 * | 9/2006 | Kimura et al. ............... 525/314 |
| 7,129,294 B2 * | 10/2006 | Nakagawa et al. ........... 525/100 |

FOREIGN PATENT DOCUMENTS

| EP | 0 264 214 A2 | 4/1988 |
| EP | 0 921 157 A1 | 6/1999 |
| JP | 11-100473 A | 4/1999 |
| JP | 11-100508 A | 4/1999 |
| JP | 2000-119478 A | 4/2000 |
| JP | 2001-247722 A | 9/2001 |
| JP | 2002-226665 A | 8/2002 |
| JP | 2002-226667 A | 8/2002 |
| WO | WO 98/14518 | 4/1998 |
| WO | WO 02/32994 A2 | 4/2002 |
| WO | WO 02/053644 A2 | 7/2002 |

OTHER PUBLICATIONS

Shim et al. "Novel Thermoplastic Elastomers . . . " Journal of Polymer ScienceA:Polymer Chemistry vol. 36,2997-3012 (1998).*
International Search Report from Corresponding International Application No. PCT/JP02/13419, dated Apr. 22, 2003, 2 pages.
Abstract No. XP-002494912 (for JP 03 152164) dated Sep. 15, 2008, 1 page.
Abstract No. XP-002494911 (for JP 2002 226667) dated Sep. 15, 2008, 2 pages.
Supplementary European Search Report from Application No. EP 02 79 0833.4, dated Sep. 22, 2008, 3 pages.

* cited by examiner

*Primary Examiner*—Jeffrey C Mullis
(74) *Attorney, Agent, or Firm*—Brinks Hofer Gilson & Lione

(57) ABSTRACT

The novel thermoplastic elastomer composition of the present invention, which comprises an isobutylene block copolymer (A) containing a polymer block composed predominantly of isobutylene and a polymer block composed predominantly of an aromatic vinyl compound and an alkenyl-terminated isobutylene polymer (B), is highly flexible, and satisfactory in good moldability, rubber-like characteristics, mechanical strengths, permanent compression set characteristics and vibration damping properties.

15 Claims, No Drawings

THERMOPLASTIC ELASTOMER COMPOSITION

RELATED APPLICATIONS

This application is a nationalization of PCT application PCT/JP2002/013419 filed on Dec. 24, 2002.

TECHNICAL FIELD

The present invention relates to a novel thermoplastic elastomer composition which is highly flexible, and is satisfactory in good moldability, rubber-like characteristics, mechanical strengths, permanent compression set characteristics and vibration damping properties.

BACKGROUND ART

Heretofore, as high polymer materials having rubber-like elasticity, those obtained by formulating a crosslinking agent, a reinforcing material, and the like in various rubbers, such as natural and synthetic rubbers, and crosslinking the resulting compositions at high temperature and high pressure have been used broadly. However, such rubbers require prolonged crosslinking and molding under high-temperature, high-pressure conditions, thus being poor in processability. Moreover, the crosslinked rubbers do not exhibit thermoplasticity so that, unlike thermoplastic resins, recycle molding is generally infeasible. For this reason, recent years have seen the development of several thermoplastic elastomers which may be easily processed into shaped articles by utilizing the universal melt-molding techniques such as hot-press molding, injection molding and extrusion molding as it is the case with ordinary thermoplastic resins.

Additionally, a plasticized polyvinyl chloride compound has been generally used as a material having flexibility. Indeed it has been used for various uses as a flexible material at room temperature, but it is demanded to be substituted with other alternative materials in view of recent request of PVC elimination. Therefore, a thermoplastic elastomer compositions have been used as alternatives thereof.

As such thermoplastic elastomers, several polymers in the olefin, urethane, ester, styrenic, and vinyl chloride series have been developed and are on the market today.

Among these polymers, styrenic thermoplastic elastomers are highly flexible and exhibit satisfactory rubber-like elasticity at atmospheric temperature. As such styrenic thermoplastic elastomers, styrene-butadiene-styrene block copolymer (SBS), styrene-isoprene-styrene block copolymer (SIS), and the corresponding hydrogenated elastomers such as styrene-ethylenebutylene-styrene block copolymer (SEBS) and styrene-ethylenepropylene-styrene block copolymer (SEPS) are developed. However, these block copolymers are inadequate in permanent compression set characteristics.

Meanwhile, as a thermoplastic elastomer having good flexibility and exhibiting good rubber-like elasticity at atmospheric temperature, and, furthermore, having excellent gas barrier and sealing properties, an isobutylene block copolymer comprising a polymer block composed predominantly of isobutylene and a polymer block composed predominantly of an aromatic vinyl compound is known. However, this isobutylene block copolymer has also proved unsatisfactory in the degree of compressive deformation on heating (permanent compression set) and in rubber-like elasticity at high temperature.

Also known is a thermoplastic polymer composition comprising a crosslinking product of an isobutylene block copolymer component containing a polymer block composed predominantly of isobutylene and a rubber component (WO98/14518). This composition is improved in permanent compression set characteristics, but it is still unsatisfactory.

SUMMARY OF THE INVENTION

Developed in the above state of the art, the present invention has for its object to provide a novel thermoplastic elastomer composition which is highly flexible, and is satisfactory in good moldability, rubber-like characteristics, mechanical strengths, permanent compression set characteristics and vibration damping properties.

Namely, the present invention relates to a thermoplastic elastomer composition which comprises an isobutylene block copolymer (A) containing a polymer block composed predominantly of isobutylene and a polymer block composed predominantly of an aromatic vinyl compound and an alkenyl-terminated isobutylene polymer (B).

The present invention also relates to the said thermoplastic elastomer composition, wherein the alkenyl-terminated isobutylene polymer (B) is at least one polymer selected from a group consisting of (B-1) an alkenyl-terminated isobutylene homopolymer or a alkenyl-terminated isobutylene random copolymer, and (B-2) a modified alkenyl-terminated isobutylene block copolymer comprising a polymer block composed predominantly of isobutylene and a polymer block composed predominantly of an aromatic vinyl compound.

Furthermore, the present invention relates to said thermoplastic elastomer composition, wherein the alkenyl-terminated isobutylene polymer (B) is an allyl-terminated polymer obtainable by substitution reaction of terminal chlorine atom of the isobutylene polymer with allyltrimethylsilane.

Moreover, the present invention relates to said thermoplastic elastomer composition, wherein the alkenyl-terminated isobutylene polymer (B) is crosslinked dynamically at melt-mixing of the isobutylene block copolymer (A) with the alkenyl-terminated isobutylene polymer (B); and to the above thermoplastic elastomer composition, wherein the alkenyl-terminated isobutylene polymer (B) is the crosslinked in a stage preceding the blending with isobutylene block copolymer (A).

Furthermore, the present invention relates to said thermoplastic elastomer composition, wherein the block constituting the isobutylene block copolymer (A) is a triblock copolymer comprising a polymer block (a) composed predominantly of isobutylene and a polymer block (b) composed predominantly of an aromatic vinyl compound and having the structure represented as (b)-(a)-(b).

Moreover, the present invention relates to said thermoplastic elastomer composition which further comprises a crosslinking agent (C);

said thermoplastic elastomer composition wherein the crosslinking agent (C) is a hydrosilyl group-containing compound;

said thermoplastic elastomer composition which further comprises a plasticizer (D);

said thermoplastic elastomer composition wherein the plasticizer (D) is at least one selected from the group consisting of paraffinic mineral oil and naphthene mineral oil;

said thermoplastic elastomer composition which further comprises a reinforcing material (E); and said thermoplastic elastomer composition wherein the reinforcing material (E) is at least one selected from the group consisting of polystyrene, polyphenyleneether and mixture thereof.

Furthermore, the present invention relates to the said thermoplastic elastomer composition wherein the alkenyl-terminated isobutylene polymer (B) is a polymer having weight average molecular weight of 1,000 to 500,000 and containing at least 0.2 alkenyl groups per molecule at the molecular chain terminus; and the present invention relates to said thermoplastic elastomer composition which comprises 5 to 1000 weight parts of isobutylene block copolymer (A) per 100 weight parts of the alkenyl-terminated isobutylene polymer (B).

DETAILED DESCRIPTION OF THE INVENTION

The thermoplastic elastomer composition of the present invention is a thermoplastic elastomer composition which comprises an isobutylene block copolymer (A) containing a polymer block composed predominantly of isobutylene and a polymer block composed predominantly of an aromatic vinyl compound, and an alkenyl-terminated isobutylene polymer (B).

The polymer block composed predominantly of isobutylene in the isobutylene block copolymer (A) of the invention is a block which accounts for not less than 50% by weight, preferably not less than 70% by weight, more preferably not less than 90% by weight, in the total weight of the polymer block composed predominantly of isobutylene.

The monomer or monomers other than isobutylene in the polymer block composed predominantly of isobutylene are not particularly restricted provided that they are cationically polymerizable monomer components. Thus, such monomers as aromatic vinyl compounds, aliphatic olefins, dienes, vinyl ethers, and β-pinene, among others, can be mentioned. These may be used each independently or in a combination of two or more species.

Such aromatic vinyl compounds which can be mentioned, among others, are styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m-, or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m-, or p-t-butylstyrene, o-, m-, or p-methoxystyrene, o-, m-, or p-chloromethylstyrene, o-, m-, or p-bromomethylstyrene, silyl-substituted styrene derivatives, indene, vinyl naphthalene and the like. These may be used each independently or in combination two or more species.

As said aliphatic olefins, there may be mentioned, among others, ethylene, propylene, 1-butene, 2-methyl-1-butene, 3-methyl-1-butene, pentene, hexene, cyclohexene, 4-methyl-1-pentene, vinylcyclohexane, octane, norbornene and the like. These may be used each independently or in a combination of two or more species.

As said dienes, there may be mentioned, among others, butadiene, isoprene, hexadiene, cyclopentadiene, cyclohexadiene, dicyclopentadiene, divinylbenzene, ethylidenenorbornene and the like. These may be used each independently or in a combination of two or more species.

As said vinyl ethers, there may be mentioned, among others, methylvinylether, ethylvinylether, (n- or iso)propylvinylether, (n-, sec-, tert-, or iso)butylvinylether, methylpropenylether, ethylpropenylether and the like. These may be used each independently or in a combination of two or more species.

The polymer block composed predominantly of aromatic vinyl compounds in the isobutylene block copolymer (A) is a block which accounts for not less than 50% by weight, preferably not less than 70% by weight, more preferably not less than 90% by weight, in the total weight of the polymer block composed predominantly of an aromatic vinyl compound(s).

The monomer or monomers other than aromatic vinyl compounds in the polymer block composed predominantly of aromatic vinyl compound(s) are not particularly restricted provided that they are cationically polymerizable monomer components. Thus, such monomers as aliphatic olefins, dienes, vinyl ethers, and β-pinene, among others, can be mentioned. These may be used each independently or in a combination of two or more species. Specific examples of the aliphatic olefins, dienes and vinylethers are the same as mentioned above.

The aromatic vinyl compound is not particularly restricted but includes styrene, α-methylstyrene, β-methylstyrene, p-methylstyrene, t-butylstyrene, monochlorostyrene, dichlorostyrene, methoxystyrene and indene, among others. These may be used each independently or in a combination of two or more species. Among the compounds mentioned above, styrene, α-methylstyrene, p-methylstyrene and indene are preferred in terms of the balance among cost, physical properties and productivity. Moreover, two or more species may be chosen from among them and used, if desired.

The relative amount of the polymer block (a) composed predominantly of isobutylene and that of the polymer block (b) composed predominantly of an aromatic vinyl compound in the isobutylene block copolymer (A) are not particularly restricted but, in consideration of the balance between physical properties and processability, it is preferable to insure that the polymer block (a) composed predominantly of isobutylene accounts for 95 to 20 weight parts and the polymer block (b) composed predominantly of an aromatic vinyl compound account for 5 to 80 weight parts. The particularly preferred proportions are that the polymer block (a) composed predominantly of isobutylene accounts for 90 to 60 weight parts and the polymer block (b) composed predominantly of an aromatic vinyl compound accounts for 10 to 40 weight parts.

The structure of the isobutylene block copolymer (A) which is preferred in terms of the physical properties and processability of the final composition comprises at least one polymer block (a) composed predominantly of isobutylene and at least two polymer blocks (b) composed predominantly of an aromatic vinyl compound. The structure mentioned above is not particularly restricted but includes a triblock copolymer consisting of (b)-(a)-(b) blocks, a multi-block copolymer consisting of repeats of the [(b)-(a)] block, and a stellate structure with arms each consisting in a diblock copolymer of (b)-(a) blocks, among others. These may be used each independently or in a combination of two or more species. Preferably, the structure is a triblock copolymer consisting of (b)-(a)-(b) blocks.

Furthermore, such an isobutylene block copolymer (A) may contain, other than above structure, at least one of a polymer composed predominantly of isobutylene, a polymer composed predominantly of an aromatic vinyl compound and a diblock copolymer composed of the (a)-(b) structure. From the standpoint of physical properties and processability, however, it is preferred that a (b)-(a)-(b) structure, which comprises at least one polymer block (a) composed predominantly of isobutylene and at least two polymer blocks (b) composed predominantly of an aromatic vinyl compound contained in the isobutylene block copolymer (A), is contained in the ratio of at least 50% by weight of the total weight of isobutylene block copolymer (A).

The weight average molecular weight of the isobutylene block copolymer (A) is not particularly restricted but is preferably 30,000 to 500,000, particularly 40,000 to 400,000. If the weight average molecular weight is less than 30,000, the necessary mechanical and other characteristics tend not to be sufficiently expressed. If it exceeds 500,000, moldability tends to deteriorate.

As the method for producing the isobutylene block copolymer (A), a method which can be mentioned are, for example, one which comprises cationically polymerizing an isobutylene monomer(s) and optionally other monomer in inert solvent with appropriate polymerization initiator system, and then cationically polymerizing an aromatic vinyl monomer(s) and optionally other monomer in turn so as to be in each desired block sequence. Examples of the polymerization initiator system which may be used in such method include a mixed system of a Lewis acid(s) and an organic compound(s) which can be generate active species to cationic polymerization. As such a Lewis acid, titanium tetrachloride, tin tetrachloride, boron trichloride, aluminum trichloride or the like may be mentioned, among others. As said organic compound, there may be mentioned, among others, alkoxy-, acyloxy-, halogen- or the like group-functionalized organic compounds, such as 1-chloro-1-methylethylbenzene[$C_6H_5C(CH_3)_2Cl_2$], bis(1-chloro-1-methylethyl)benzene[$C_6H_4(C(CH_3)_2Cl)_2$], tris(1-chloro-1-methylethyl)benzene[(ClC$(CH_3)_2)_3C_6H_3$]. Additionally, together with the above Lewis acid and above organic compound, for example, pyridines, amines, amides, sulfoxides, esters, or metal compounds having oxygen atom bonded to metal atom may be used optionally as an electron donating component. The inert solvent which can be used for the polymerization includes, among others, hexane, cyclohexane, methylcyclohexane, toluene, methyl chloride, methylene dichloride, n-butylchloride and the like.

For example, (b)-(a)-(b) triblock copolymer may be prepared according to the method which comprises forming block (b) by polymerizing an aromatic vinyl monomer(s) in the presence of a Lewis acid and an organic compound having one functional group which can be generate active species to cationic polymerization, as the polymerization initiator system; then, adding isobutylene to thus-obtained reaction mixture to polymerize, to form block (a); and further adding the aromatic vinyl monomer(s) to the reaction mixture to polymerize, to form block (b). Alternatively, the triblock copolymer may be prepared according to the method which comprises forming block (a) at the central position by polymerizing isobutylene in the presence of a Lewis acid and an organic compound having two functional groups which can be generate active species to cationic polymerization, as the polymerization initiator system; and then, adding an aromatic vinyl monomer(s) to the reaction system to polymerize, to form block (b) at the both sides of block (a). A (b)-(a) diblock copolymer and a (a)-(b)-(a) triblock copolymer may be prepared in accordance with the similar method as described above. Furthermore, a stellate structure polymer may be prepared according to the method which comprises using a Lewis acid and an organic compound having three or more functional groups which can be generate active species to cationic polymerization, as the polymerization initiator system, or the method which comprises producing (b)-(a) diblock copolymer, and then coupling (bonding) the copolymer with a polyfunctional compound used as a coupling agent (binder).

As examples of the alkenyl-terminated isobutylene polymer (B), those may be mentioned, among others, are at least one selected from the group consisting of (B-1) an alkenyl-terminated isobutylene homopolymer or a alkenyl-terminated isobutylene random copolymer, and (B-2) a modified alkenyl-terminated isobutylene block copolymer comprising a polymer block composed predominantly of isobutylene and a polymer block composed predominantly of an aromatic vinyl compound.

Regarding (B-1), namely the alkenyl-terminated isobutylene homopolymer or the alkenyl-terminated isobutylene random copolymer, the monomer unit derived from isobutylene is preferably in a proportion not less than 50% by weight, more preferably not less than 70% by weight, still more preferably not less than 90% by weight, based on the total weight of the polymer (B-1).

In the case that the polymer (B-1) is an alkenyl-terminated isobutylene random copolymer, the monomer or monomers other than isobutylene are not particularly restricted provided that they are cationically polymerizable monomer components. Thus, such monomers as aromatic vinyl compounds, aliphatic olefins, dienes, vinyl ethers, and β-pinene, among others, can be mentioned. These may be used each independently or in a combination of two or more species. Specific examples of the aromatic vinyl compounds, aliphatic olefins, dienes and vinylethers are the same as mentioned above.

Regarding the modified alkenyl-terminated isobutylene block copolymer (B-2) comprising a polymer block composed predominantly of isobutylene and a polymer block composed predominantly of an aromatic vinyl compound, isobutylene is preferably contained in the polymer block composed predominantly of isobutylene in a proportion not less than 50% by weight, more preferably not less than 70% by weight, still more preferably not less than 90% by weight, based on the total weight of the polymer block.

Here, the modified alkenyl-terminated isobutylene block copolymer (B-2) comprising a polymer block composed predominantly of isobutylene and a polymer block composed predominantly of an aromatic vinyl compound, is a modification of the copolymer illustrated in the explanation of the isobutylene block copolymer (A), whose molecular terminal is modified with alkenyl group. Thus, specific examples of the polymer block composed predominantly of isobutylene and the polymer block composed predominantly of the aromatic group may be the same as mentioned above for the isobutylene block copolymer (A) can be mentioned, respectively.

Moreover, said each polymer block may be the same or different from each component of the isobutylene block copolymer (A) in molecular weight or the like.

Furthermore, each polymer block composed predominantly of isobutylene, or each polymer block composed predominantly of an aromatic vinyl compound may be the same or different in its components.

The weight average molecular weight of the alkenyl-terminated isobutylene polymer (B) is not particularly restricted but is preferably 1,000 to 500,000, and more preferably 2,000 to 100,000. When the weight average molecular weight is less than 1,000, mechanical properties and the like may not be fully expressed. On the other hand, when it exceeds 500,000, the improving effect of permanent compression set tends to be deteriorated, as well as moldability or other characteristics apt to be degraded.

Among the isobutylene polymer, an isobutylene homopolymer and an isobutylene random copolymer may be produced by cationic polymerization of single isobutylene monomer or of isobutylene with other monomer. Meanwhile, an isobutylene block copolymer containing a polymer block composed predominantly of isobutylene and a polymer block composed predominantly of an aromatic vinyl compound may be produced in the same method as mentioned for the above isobutylene block copolymer (A).

Next, the alkenyl group, which the isobutylene polymer (B) has at its molecular terminus, is not particularly restricted provided that the group contains an active carbon-carbon double bond to crosslinking reaction of the (B) component in order to attain the objects of the invention. Specific examples of such groups as can be mentioned are aliphatic unsaturated hydrocarbon group such as vinyl, allyl, methylvinyl, propenyl, butenyl, pentenyl or hexenyl group; cyclic unsaturated hydrocarbon group such as cyclopropenyl cyclobutenyl, cyclopentenyl or cycrohexenyl group; and the like.

As for the method to introduce an alkenyl group into a terminus of the isobutylene polymer (B) of the invention, there may be used a technology which, as disclosed in Japanese Kokai Publication Hei-3-152164 and Japanese Kokai Publication Hei-7-304909, comprises reacting a polymer having a hydroxyl or the like functional group with an unsaturated bond-containing compound to thereby introduce the unsaturated bond into the polymer. Moreover, for introducing an unsaturated bond into a halogen-containing polymer, there can be used a method which comprises carrying out a Friedel-Crafts reaction with an alkenyl phenyl ether, a method comprising a substitution reaction with allyltrimethylsilane or the like in the presence of a Lewis acid, or a method which comprises carrying out a Friedel-Crafts reaction with a various phenol compound to introduce a hydroxyl group and, then, carrying out the alkenyl group-introducing reaction referred to above. Furthermore, as disclosed in U.S. Pat. No. 4,316,973, Japanese Kokai Publication Sho-63-105005, and Japanese Kokai Publication Hei-4-288309, the unsaturated bond may be introduced at polymerization of the monomer.

Preferred one in the present invention is ally-terminated polymer which can be obtained by substitution reaction with allytrimethylsilane. Namely, ally-terminated polymer, which can be obtained by substitution reaction of allyltrimethylsilane with a terminal chlorine atom of isobutylene polymer, is preferred. A Lewis acid is used in such a reaction, and as such Lewis acid, titanium tetrachloride, tin tetracholoride, boron trichloride and aluminum trichloride may be mentioned, among others.

The number of terminal alkenyl group is preferably not less than 0.2 per polymer molecule, more preferably not less than 0.5 in view of permanent compression set of the composition obtained.

Preferably, the thermoplastic elastomer composition of the present invention, which comprises the isobutylene block copolymer (A) and the alkenyl-terminated isobutylene polymer (B), is a composition which is crosslinked dynamically in the stage of melt-mixing of (A) with (B) or a composition obtainable by the crosslinking of the alkenyl-terminated isobutylene polymer (B) effected in a preceding stage and then melt-mixing thus-obtained crosslinked polymer with isobutylene block copolymer (A). Among them, the composition crosslinked in melt-mixing, what is called, dynamically-crosslinked composition is preferable.

The crosslinked body formed in such crosslinking process includes one obtainable by single crosslinking of (B) and one obtainable by crosslinking in the simultaneous presence of (A) and (B).

The means of crosslinking the alkenyl-terminated isobutylene polymer (B) may be a known one and is not particularly restricted. For example, thermal-crosslinking by heating, crosslinking with the aid of a crosslinking agent (C) and radical-crosslinking without crosslinking agent may be mentioned.

In the case of thermal-crosslinking, the polymer may be heated to about 150° C. to 210° C.

In the case of crosslinking with the aid of a crosslinking agent (C), the crosslinking agent (C) which may be used to obtain a crosslinked compound of the alkenyl-terminated isobutylene polymer (B) is preferably a hydrosilyl group-containing compound.

The hydrosilyl group-containing compound is not particularly restricted but a variety of compounds can be employed. For example, there may be used linear polysiloxanes represented by the general formula (I) or (II):

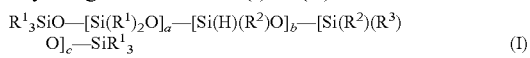

(I)

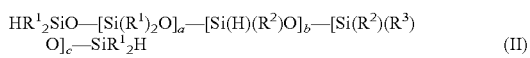

(II)

(in the formula, $R^1$ and $R^2$ each independently represents an alkyl group of 1 to 6 carbon atoms or a phenyl group; $R^3$ represents an alkyl group of 1 to 10 carbon atoms or aralkyl group of 7 to 10 carbon atoms; a, b, and c are integers satisfying the relations $0 \leq a \leq 100$, $2 \leq b \leq 100$, and $0 \leq c \leq 100$, respectively) and cyclic siloxanes represented by the general formula (III):

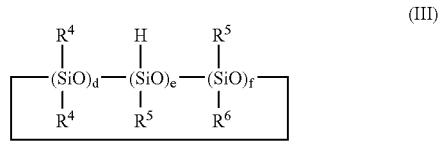

(III)

(in the formula, $R^4$ and $R^5$ each independently represents an alkyl group of 1 to 6 carbon atoms or a phenyl group; $R^6$ represents an alkyl group of 1 to 10 carbon atoms or aralkyl group of 7 to 10 carbon atoms; d, e, and f are integers satisfying the relations $0 \leq d \leq 8$, $2 \leq e \leq 10$ and $0 \leq f \leq 8$, respectively, and further satisfying the relation $3 \leq d+e+f \leq 10$).

Furthermore, among the above hydrosilyl (Si—H) group-containing compounds, those compounds which may be represented by the following general formula (IV) are particularly preferred in terms of compatibility between the components (B);

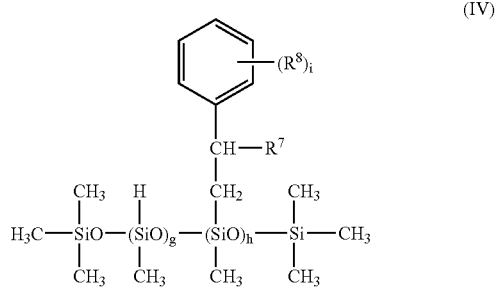

(IV)

(in the formula, g and h are integers satisfying the relations $2 \leq g$, and $0 \leq h$ and further satisfying the relation $2 \leq g+h \leq 50$; $R^7$ represents a hydrogen atom or a methyl group; $R^8$ represents a hydrocarbon group of 2 to 20 carbon atoms and may optionally be substituted one or more aromatic ring moieties; i is an integer of $0 \leq i \leq 5$).

As the alkyl group of 1 to 10 carbon atoms as $R^3$ and $R^6$, there may be mentioned, for example, methyl, ethyl, propyl, butyl, pentyl, hexyl, heptyl, octyl, nonyl and decyl group, among others. As examples of the alkyl group of 1 to 6 carbon atoms as $R^1$, $R^2$, $R^4$ and $R^5$, methyl, ethyl, propyl, butyl, pentyl and hexyl group may be mentioned among the above examples. As examples of the aralkyl group of 7 to 10 carbon atoms as $R^3$ and $R^6$, there may be mentioned benzyl, phenylethyl, phenylpropyl, 1-phenyl-1-methylethyl and 4-methylphenylethyl group, among others. Furthermore, as the group which may optionally be substituted one or more aromatic ring moieties, for example, ethyl, propyl, butyl, pentyl, hexyl, heptyl, octyl, nonyl, decyl, phenyl, benzyl and phenylethyl group may be mentioned, among others.

While the alkenyl-terminated isobutylene polymer (B) and crosslinking agent (C) may be admixed in any desired ratio, it is preferable from curability points of view that the molar ratio of the alkenyl group to the hydrosilyl group (alkenyl/hydrosilyl) should be within the range of 0.2 to 5. The range of 0.4 to 2.5 is still more preferred. If the molar ratio referred to above exceeds 5, crosslinking tends to be insufficient so that strength of the composition tends to be degraded. On the contrary, if the ratio is less than 0.2, many active hydrosilyl groups may remain after crosslinking; thus the obtained composition tends to be deficient in homogeneity and strength.

The crosslinking reaction of the polymer (B) and the crosslinking agent (C) proceeds as the two materials are blended and heated but in order to hasten the reaction, a hydrosilylation catalyst can be added. The hydrosilylation catalyst that can be used for this purpose is not particularly restricted but includes radical initiators, such as organic peroxides and azo compounds, and transition metal catalysts, among others.

The organic peroxides referred to above is not particularly restricted but includes dialkyl peroxides, such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, α,α'-bis(t-butylperoxy)isopropylbenzene, etc.; acyl peroxides, such as benzoyl peroxide, p-chlorobenzoyl peroxide, m-chlorobenzoyl peroxide, 2,4-dichlorobenzoyl peroxide, lauroyl peroxide, etc.; peracid esters, such as t-butyl perbenzoate; peroxydicarbonates, such as diisopropyl peroxydicarbonate, di-2-ethylhexyl peroxydicarbonate, etc.; and peroxyketals, such as 1,1-di(t-butylperoxy)cyclohexane, 1,1-di(t-butylperoxy)-3,3,5-trimethylcyclohexane, etc. and so forth. Among them, 2,5-dimethyl-2,5-di(t-butylperoxy)hexane and 2,5-dimethyl-2,5-di(t-butylperoxy)-3-hexyne are preferred in terms of odor, coloring potential, and scorch stability.

The azo compound referred to above is not particularly restricted but includes 2,2'-azobis-isobutyronitrile, 2,2'-azobis-2-methylbutyronitrile, 1,1'-azobis-1-cyclohexane carbonitrile, 2,2'-azobis(2,4-dimethylvaleronitrile, 2,2'-azoisobutyrovaleronitrile and so forth.

The transition metal catalyst referred to above is not particularly restricted but includes platinum metal, a solid platinum dispersion on a matrix such as alumina, silica, carbon black, or the like, chloroplatinic acid, complexes of chloroplatinic acid with alcohols, aldehydes or ketones, platinum-olefin complexes, platinum allylsiloxanes such as platinum (0)-diallyltetramethyldisiloxanes complexes, and so forth. As transition metal catalysts other than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$, and $TiCl_4$, by way of example. These hydrosilylation catalysts can be used each independently or in a combination of two or more species.

Among them, platinum allylsiloxanes is the most advantageous in terms of compatibility, crosslinking efficiency and scorch stability.

The level of use of the hydrosilylation catalyst is not particularly restricted but, for each mol of the alkenyl group in component (B), the catalyst is used preferably within the range of $10^{-1}$ to $10^{-8}$ mol, more preferably within the range of $10^{-3}$ to $10^{-6}$ mol. If the amount of the catalyst is less than $10^{-8}$ mol, the curing reaction tends not to be proceeded sufficiently. On the other hand, because any hydrosilylation catalyst is expensive, it is advisable to refrain from using the catalyst in excess over $10^{-1}$ mol.

In the case of radical-crosslinking without crosslinking agent, co-presence of a catalyst is preferred. As such catalyst, a radical initiator such as an organic peroxide may be used. Such an organic peroxide is not particularly restricted, and specific and preferred examples can be mentioned the same ones as described above.

In the case of the radical crosslinking without crosslinking agent, the formulation level of the organic peroxide is preferably 0.5 to 5 weight parts per 100 weight parts of the isobutylene block copolymer (A) at the time of adding the organic peroxide.

Whether a crosslinking agent is used or not, an auxiliary crosslinking agent having an ethylenically unsaturated group may be further formulated to the composition of the invention in crosslinking treatment with an organic peroxide as a catalyst. The auxiliary crosslinking agent having an ethylenically unsaturated group includes polyfunctional vinyl monomers, such as divinylbenzene, triallyl cyanurate, etc., and polyfunctional methacrylate monomers, such as ethylene glycol dimethacrylate, diethylene glycol dimethacrylate, triethylene glycol dimethacrylate, polyethylene glycol dimethacrylate, trimethylolpropane trimethacrylate, allyl methacrylate and so forth. These may be used each independently or in a combination of two or more species. By using such a compound as above in combination with said organic peroxide, a more uniform and efficient crosslinking reaction can be expected.

Among the above compounds, ethylene glycol dimethacrylate and triethylene glycol dimethacrylate are preferred because they are not only easy to handle but also have a solubilizing effect on the peroxide and act as an auxiliary dispersant for the peroxide, thus making the effect of crosslinking by heating treatment uniform and pronounced and, hence, a thermoplastic elastomer balanced in hardness and rubber-like elasticity is more certainly obtained.

The level of addition of said auxiliary crosslinking agent is preferably not more than 20 weight parts per 100 weight parts of the alkenyl-terminated isobutylene polymer (B). If the level exceeds 20 weight parts, the auxiliary crosslinking agent itself tends to undergo gelation, and in addition, the cost may be increased.

In addition to the isobutylene block copolymer (A) and alkenyl-terminated isobutylnene polymer (B), the composition of the invention may contain a plasticizer (D) for improved moldability and flexibility.

As the plasticizer (D), the mineral oil for use in the processing of rubber, a liquid or low-molecular weight synthetic softening agent or the like can be used.

The mineral oil includes paraffinic, naphthenic and aromatic high-boiling petroleum fractions, although paraffinic and naphthenic high-boiling petroleum fractions which do not interfere with the crosslinking reaction are preferred. The liquid or low-molecular weight synthetic softening agent is not particularly restricted but includes polybutene, hydrogenated polybutene, liquid polybutadiene, hydrogenated liquid polybutadiene, and poly(α-olefins), among others. Among them, polybutene and hydrogenated polybutene are preferable.

These species of plasticizer (D) may be used singly or in a suitable combination thereof.

The plasticizer (D) may be added if desired, and the formulating level thereof is preferably 0 to 300 weight parts per 100 weight parts of the total amount of the isobutylene block copolymer (A) and the alkenyl-terminated isobutylene (B). If the formulating level exceeds 300 weight parts, mechanical strength tends to be adversely affected.

In addition to the isobutylene block copolymer (A) and alkenyl-terminated isobutylene polymer (B), the composition of the invention may contain a reinforcing material (E) for further improved strength.

The reinforcing material (E) includes reinforcing resins such as polyphenyleneether, polystyrene and mixture thereof; inorganic fillers such as calcium carbonate, talc, mica, kaolin, silica and grass fiber; carbon black; and the like. Those preferred are Polyphenyleneether, polystyrene and mixture thereof. These may be used each independently or in combination of two or more. Addition of reinforcing material (E) may improve tensile strength of thermoplastic elastomer composition, as well as permanent compression set depending on the level of addition and type of reinforcing material.

The reinforcing material (E) may be added if desired, and the formulating level thereof is preferably 0 to 50 weight parts per 100 weight parts of the total amount of the isobutylene block copolymer (A) and the alkenyl-terminated isobutylene (B). If the formulating level exceeds 50 weight parts, flexibility tends to be deteriorated and moldability tends to decrease.

The composition of the invention may be further supplemented with various other ingredients or additives suited to the specific characteristics required of each end use within the range not adversely affecting physical properties; for example elastomers such as styrene-butadiene-styrene block copolymer (SBS) and styrene-isoprene-styrene block copolymer (SIS), the corresponding hydrogenated styrene-ethylenebutylene-styrene block copolymer (SEBS) and styrene-ethylenepropylene-styrene block copolymer (SEPS), etc., PPO, hindered phenol or hindered amine series antioxidants, ultraviolet absorbers, light stabilizers, pigments, surfactants, retardants, flame retardants, fillers and so forth, each in an appropriate proportion.

The thermoplastic elastomer composition preferably contains 5 to 1000 weight parts of isobutylene block copolymer (A) per 100 parts of alkenyl-terminated isobutylene polymer (B).

More preferred composition is one which contains 5 to 1000 weight parts of isobutylene block polymer (A) with 0.01 to 20 weight parts of crosslinking agent (C) per 100 weight parts of alkenyl-terminated isobutylene polymer (B). As the level of addition of isobutylene block polymer increases, moldability may be improved, but permanent compression set tends to be bigger. Therefore, the level of addition may be selected according to desired properties. If the formulated level of the isobutylene block polymer (A) is less than 5 weight parts, moldability tends to be decreased. On the contrary, if it exceeds 1,000 weight parts, improving effect of the permanent compression set tends to be deteriorated. Furthermore, if the formulated level of the crosslinking agent (C) is less then 0.01 weight parts, improving effect of the permanent compression set tends to be deteriorated. On the other hand, it exceeds 20 weight parts, remarkable generation of gelated ingredient of the crosslinking agent itself tends to occur.

Now the method of producing the thermoplastic elastomer composition of the invention is not particularly restricted but may be any method that provides for uniform blending of the isobutylene block copolymer (A), the alkenyl-terminated isobutylene polymer (B), and optionally the components described hereinabove.

In the case where the thermoplastic elastomer composition of the invention is to be produced by conducting a dynamical crosslinking reaction of the alkenyl-terminated isobutylene polymer (B) at the stage of melt-mixing of said isobutylene block copolymer (A) and alkenyl-terminated isobutylene polymer (B), any of following procedures can be used with advantage.

The procedure using a closed type mill or a batch mill, such as Labo Plastomill, Brabender, Banbury mixer, kneader, roll mill or the like comprises melt-mixing all the component materials but the crosslinking agent, auxiliary crosslinking agent and crosslinking catalyst until a homogeneous mixture is obtained, adding the crosslinking agent, optionally together with the auxiliary crosslinking agent and/or crosslinking catalyst, and allowing the crosslinking reaction to proceed far enough until the melt-mixing is no longer feasible.

The procedure employing a continuous melt-mixing machine, such as a single-screw extruder, a twin-screw extruder or the like, comprises (1) melt-mixing all the component materials but the crosslinking agent, auxiliary crosslinking agent and crosslinking catalyst until a homogeneous mixture is obtained, pelletizing the mixture, dry-blending the pellets with the crosslinking agent, together with the auxiliary crosslinking agent and/or crosslinking catalyst, and further melt-mixing the dry blend by means of a melt-mixing machine, such as an extruder, with dynamically crosslinking the alkenyl-terminated isobutylene polymer (B), to give a thermoplastic elastomer composition comprising the isobutylene block copolymer (A) and the alkenyl-terminated isobutylene polymer (B). An alternative method comprises (2) melt-mixing all the component materials but the crosslinking agent (C), auxiliary crosslinking agent and crosslinking catalyst with a melt-mixing machine such as an extruder, adding the crosslinking agent, optionally together with the auxiliary crosslinking agent and/or crosslinking catalyst, partway of the cylinder of the extruder, and dynamically crosslinking the alkenyl-terminated isobutylene polymer (B) by further melt-mixing the mixture, to give a thermoplastic elastomer composition comprising the isobutylene block copolymer (A) and the alkenyl-terminated isobutylene polymer (B).

In carrying out the above procedure for concurrent melt-mixing and dynamic crosslinking, the melt-mixing is preferably carried out under heating at 150 to 210° C., more preferably at 160 to 200° C.

In this case, the alkenyl-terminated isobutylene polymer (B) can be crosslinked without causing the isobutylene block copolymer (A) to crosslink.

For producing the thermoplastic elastomer composition of the invention by causing the alkenyl-terminated isobutylene polymer (B) to crosslink in advance and blending the thus-obtained crosslinked polymer with the isobutylenic block copolymer (A), the following procedure, for instance, can be used with advantage.

Thus, the thermoplastic elastomer composition of the invention can be produced by adding the crosslinking agent, optionally together with the auxiliary crosslinking agent and/or crosslinking catalyst to the alkenyl-terminated isobutylene polymer (B), kneading the mixture thoroughly at a suitable temperature by means of a kneader which is conventionally used in the manufacture of crosslinked rubber products, feeding the kneaded mass to a hot-press machine or the like and allowing it to crosslink at a suitable temperature for a suitable time, cooling the reaction mixture, and crushing it to give a crosslinked polymer of the alkenyl-terminated isobutylene polymer (B), and melt-mixing this crosslinked polymer and the isobutylene block copolymer (A) together to give the thermoplastic elastomer composition of the invention.

In this connection, as the method of melt-mixing the crosslinked polymer of the crosslinked polymer of the alkenyl-terminated polymer (B) with the isobutylene block copolymer (A), any of the known techniques heretofore in use for the production of thermoplastic resin or thermoplastic elastomer compositions can be employed and carried into practice by using a melt-mixing machine such as Labo Plastomill, Banbury mixer, single-screw extruder, twin-screw extruder or the like. The preferred melt-mixing temperature is 150 to 210° C., and more preferred is 160 to 200° C.

The thermoplastic elastomer composition of the present invention can be molded by the molding technology and device in routine use for thermoplastic resin compositions, that is to say by melt-molding, such as extrusion molding, injection molding, press molding, blow molding, and so forth.

Since the thermoplastic elastomer composition of the invention has very satisfactory flexibility, moldability, rubber-like characteristics, mechanical strengths, permanent compression set and vibration damping properties, it can be used with advantage in a variety of applications, such as sealing materials, e.g. packing, sealants, gaskets, plugs, etc., dampers for light electrical appliances such as CD dampers, architectural dampers, vibration damping materials for automobiles and other road vehicles, household electrical appliances, etc., vibration preventing materials, car upholstery, cushioning materials, sundry goods, electrical parts, electronic parts, members of sporting goods, grips or cushioning pads, electric conductor sheaths, packaging materials, various vessels, and stationery articles.

BEST MODE FOR CARRYING OUT THE INVENTION

The following examples illustrate the present invention in further detail without defining the scope of the invention.

Before presenting the examples, the various methods of determinations and various evaluation methods used are described.

Hardness

In accordance with JIS K 6352; a 12.0 mm-thick pressed sheet was used as the testpiece.

Tensile Braking Strength

In accordance with JIS K 6251; a No. 3 dumbbell test specimen obtained by punching out from 2 mm-thick pressed sheet was used. Testing speed was set to 500 mm/min.

Tensile Elongation at Break

In accordance with JIS K 6251; a No. 3 dumbbell test specimen obtained by punching out from 2 mm-thick pressed sheet was used. Testing speed was set to 500 mm/min.

Permanent Compression Set

In accordance with JIS K 6262; a 12.0 mm-thick pressed sheet was used as the testpiece. The measuring conditions were 100° C.×22 hr and 25% deformation.

Dynamic Viscoelasticity

In accordance with JIS K 6394 (Testing Methods for Dynamic Properties of Vulcanized Rubber and Thermoplastic Rubber); a testpiece measuring 6 mm long×5 mm wide×2 mm thick was cut out and using the dynamic viscoelasticity measuring apparatus DVA-200 (manufactured by IT Instrumental Control), the loss tangent tan δ value was determined. The measuring frequency was 0.5 Hz for testing the specimens of Examples 1 or 9 and Comparative Examples 1, 4, 6 or 9, and 10 Hz for testing the specimens of Examples 5 or 7 and Comparative Example 5.

Transparency

A 2 mm-thick pressed sheet was prepared and the sheet was observed by the eye. On looking trough the sheet, the one whose reverse side can be seen was regarded as "transparent". On the other hand, the one whose reverse side cannot be seen was regarded as "opaque".

The abbreviations used for various materials in the following examples and comparative examples and the particulars of each material are given below.

APIBL: an alkenyl-terminated polyisobutylene EP 600A, product of Kaneka Corporation (Mw: 19,000, 2.0 terminally groups per molecule are contained)

IIR: butyl rubber, product of JSR (™Butyl065) Reinforcing material: polyphenylene ether, product of GE PLASTIC (™Noryl EFN4230)

Plasticizer 1: a paraffinic process oil, product of Idemitsu Petrochemical (™Diana Process Oil PW-380)

Plasticizer 2: a paraffinic process oil, product of Idemitsu Petrochemical (™Diana Process Oil PW-90)

Crosslinking agent 1: a α-methylstyrene-modified H-oil obtained by subjecting hydrosilyl group of polymethylhydrogensiloxane having an average of 9 repeating units to hydrosilylative coupling reaction with an average of 2.5 α-methylstyrene Crosslinking agent 2: a reaction-type brominated alkylphenol formaldehyde compound, product of Taoka Chemical Company (™Tackirol 250-1)

Crosslinking agent 3: polymethylhydrogensiloxane, product of GE-Toshiba silicone (™TSF-484)

Auxiliary crosslinking agent 1: Triethylene glycol dimethacrylate, product of Shin-Nakamura Chemical (™NK ester 3G)

Auxiliary crosslinking agent 2: zinc oxide

Crosslinking catalyst: platinum(0)-1,1,3,3-tetramethyl-1,3-diallyldisiloxane complex, 1% solution in xylene

PRODUCTION EXAMPLE 1

Production of a Styrene-isobutylene-styrene Block Copolymer (SIBS 1)

The polymerization vessel in a 2L separable flask, after nitrogen purging, was charged with 456.4 mL of n-hexane (dried with molecular sieves) and 656.3 mL of butyl chloride (dried with molecular sieves) using an injection syringe and the polymerization vessel was cooled by immersion in a dry ice/methanol bath at −70° C. Then, a Teflon liquid delivery tube was connected to a pressure-resisting glass liquefaction sampling tube equipped with a 3-way cock and containing 232 mL (2871 mmol) of isobutylene monomer and the isobutylene monomer was delivered under nitrogen pressure to the polymerization vessel. Then, 0.647 g (2.8 mmol) of p-dicumyl chloride and 1.22 g (14 mmol) of N,N-dimethylacetamide were added, followed by addition of 8.67 mL (79.1 mmol) of titanium tetrachloride. The reaction mixture was stirred at the same temperature for 2.5 hours after the start of polymerization and about 1 mL of the polymer slurry was withdrawn as a sample. Then, a mixed solution composed of 77.9 g (748 mmol) of styrene monomer, 14.1 mL of n-hexane, and 20.4 mL of butyl chloride, cooled to −70° C. in advance, was fed to the polymerization vessel. Two hours following addition of the above mixed solution, the reaction mixture was poured into a large amount of water to terminate the reaction.

The reaction mixture was washed with two portions of water, the solvent were distilled off from the reaction mixture, and the polymer thus obtained was dried in vacuo at 60° C. for 24 hours to recover the objective block copolymer (SIBS 1). The molecular weight of this polymer was determined by gel permeation chromatography (GPC), and thereby the block copolymer obtained was found to have an Mn value of 129,000.

PRODUCTION EXAMPLE 2

Production of a Styrene-isobutylene-styrene Block Copolymer (SIBS 2)

The polymerization vessel of a 500 mL separable flask was subjected to nitrogen purging, and using an injection syringe, 95.4 mL of n-hexane (dried with molecular sieves) and 135 mL of butyl chloride (dried with molecular sieves) were added. The polymerization vessel was cooled by immersion in a dry ice/methanol bath at −70° C. Then, a Teflon liquid delivery tube was connected to a pressure-resisting glass liquefaction sampling tube equipped with a 3-way cock and containing 54.4 mL (576 mmol) of isobutylene monomer and the isobutylene monomer was delivered under nitrogen pressure to the polymerization vessel. Then, 0.178 g (0.77 mmol) of p-dicumyl chloride and 0.124 g (1.42 mmol) of N,N-dimethylacetamide were added, further followed by addition of 1.69 mL (15.441 mmol) of titanium tetrachloride. The reaction mixture was stirred at the same temperature for 75 minutes after the start of polymerization and about 1 mL of the polymer slurry was withdrawn as a sample. Then, 13.83 g (132.8 mmol) of styrene monomer, cooled to −70° C. in advance, was added to the polymerization vessel. Forty-five minutes following addition of the styrene monomer, the reaction mixture was poured in to a large amount of water to terminate the reaction.

After the solvent and the like were distilled off from the reaction mixture, the residue was dissolved in toluene and washed with two portions of water. This toluene solution was poured into a large quantity of methanol to precipitate the polymer and the polymer thus obtained was dried in vacuo at 60° C. for 24 hours to recover the objective block copolymer (SIBS 2). The molecular weight of this polymer was measured by gel permeation chromatography (GPC), and thereby the block copolymer obtained was found to have an Mn value of 88,300.

PRODUCTION EXAMPLE 3

Production of Alkenyl-terminated Isobutylene Copolymer (APIB 2)

Separable flask equipped with a 3-way cock, a thermocouple and a seal for stirring was subjected to nitrogen purging. After nitrogen purging, nitrogen was flowed through 3-way cock. Then, 785 ml of toluene and 265 ml of ethylcyclohexane were added into flask with syringe. After addition of solvent, moisture content was measured by using Karl Fischer's moisture titrator. After the measurement, the flask was cooled to about −70° C. Then, 277 ml (2,933 mmol) of isobutylene monomer was added into the flask. After re-cooling of the flask to about −70° C., 0.85 g (3.7 mmol) of p-dicumyl chloride and 0.68 g (7.4 mmol) of picoline dissolved in 10 ml of toluene were added. At the time when the inner temperature of the reaction system was stabilized to −74° C., polymerization was initiated by adding 19.3 ml (175.6 ml) of titanium tetrachloride. At the time when polymerization reaction was completed (90 minutes), 1.68 g (11.0 mmol) of 75% allyltrimethylsilane/toluene solution was added, and then the mixture was subjected to reaction for more two hours. Subsequently, the mixture was deactivated by adding pure water heated to about 50° C., and organic layer was washed with three portions of pure water (70 to 80° C.). Then organic solvent was distilled off at 80° C. in vacuo to recover the alkenyl-terminated isobutylene copolymer (APIB 2). Thus-obtained APIB 2 had an Mn value of 45,500, Mw/Mn value of 1.10, and 2.0 allyl groups per molecule.

EXAMPLE 1

The SIBS 1 prepared in Production Example 1 and APIB 1 were measured and formulated in the ratio indicated in Table 1 so that the total amount would become 40 g. With Labo Plastomill (manufactured by Toyo Seiki) set to 150° C., the mixture was melt-mixed for 5 minutes. Then, crosslinking agent was added in the proportions indicated in Table 1 and the mixing was continued for further 5 minutes. Then 25 µl of the crosslinking catalyst was added into the mixture, followed by further melt-mixing to cause dynamic crosslinking. Thus-obtained thermoplastic elastomer composition could be easily molded to a sheet at 180° C.

EXAMPLE 2

SIBS 1, APIB 1 and a reinforcing material were blended in the ratio indicated in Table 1 to causing dynamic crosslinking according to the same method as Example 1. Thus-obtained thermoplastic elastomer composition could be easily molded to a sheet at 180° C.

COMPARATIVE EXAMPLE 1

The SIBS 1 prepared in Production Example 1 was melt-mixed for 10 minutes by Labo Plastomill (manufactured by Toyo Seiki) set to 180° C. and then, molded into a sheet at 180° C.

COMPARATIVE EXAMPLE 2

The SIBS 1 prepared in Production Example 1 and IIR were melt-mixed with Labo Plastomill (manufactured by Toyo Seiki) at 180° C. for 5 minutes, after which crosslinking agent 1 and auxiliary crosslinking agent 1, auxiliary crosslinking agent 2 and auxiliary crosslinking agent 2 were added in the proportions indicated in Table 1 and the melt-mixing for dynamic crosslinking was carried out at 180° C. until the torque value had reached a peak level (3 to 7 minutes). Thus-obtained thermoplastic elastomer composition could be easily molded to a sheet at 180° C.

COMPARATIVE EXAMPLE 3

With the APIB 1, the composition was prepared in the ratio indicated in Table 1, according to the similar way as Example 1. But it could not be molded to a sheet form with this composition.

COMPARATIVE EXAMPLE 4

By using Rabalon(R) SJ5400N (product of Mitsubishi Chemical), a sheet was molded.

Each property of the sheets obtained in the above Examples 1 and 2 and Comparative Examples 1, 2 and 4 is measured in accordance with the method mentioned above. The results are shown in Table 1.

TABLE 1

|  | Examples | | Comp. Examples | | | |
|---|---|---|---|---|---|---|
|  | 1 | 2 | 1 | 2 | 3 | 4 |
| SIBS1 (parts by weight) | 100 | 55.5 | 100 | 100 | — | Rabalon SJ5400N (product of Mitsubishi Chemical) |
| APIB1 (parts by weight) | 100 | 100 | — | — | 100 | |
| IIR (parts by weight) | — | — | — | 100 | — | |
| Reinforcing material (parts by weight) | — | 5.5 | — | — | — | |
| Crosslinking agent 1 (parts by weight) | 9 | 9 | — | — | 9 | |
| Crosslinking agent 2 (parts by weight) | — | — | — | 10 | — | |
| Aux. crosslinking agent 1 (parts by weight) | — | — | — | 5 | — | |
| Aux. crosslinking agent 2 (parts by weight) | — | — | — | 1 | — | |
| Crosslinking catalyst (μl) | 25 | 25 | — | — | 25 | |
| Hardness (JIS A) | 36 | 43 | 50 | 35 | Not moldable | 50 |
| Tensile breaking strength (MPa) | 4.9 | 6.5 | 15.6 | 6.1 | to sheet | 8.5 |
| Tensile elongation at break (%) | 733 | 392 | 676 | 490 | | 764 |
| Permanent compression set (%) | 42 | 44 | 66 | 68 | | 23 |
| tan δ (−30° C.) | 1.31 | — | 1.22 | — | | 0.2 |
| tan δ (20° C.) | 0.19 | — | 0.24 | — | | 0.09 |

Compared with the case in which an isobutylene block copolymer SIBS as used alone, shown in Comparative Example 1, the thermoplastic elastomer compositions of the invention have lower values of permanent compression set and are superior in permanent compression set with properties of the isobutylene block copolymer maintained. It is apparent that compared with the case in which IIR was used, the thermoplastic elastomer compositions of the invention is superior in the parameter of permanent compression set in spite of having similar hardness value. Furthermore, it is also apparent that compared with Comparative Example 4, the thermoplastic elastomer composition of claim 1 has higher tan δ value, and is superior in vibration damping properties.

EXAMPLES 3 to 8

The SIBS 2 prepared in Production Example 2 and APIB 2 prepared in Production Example 3 were measured and formulated in the ratio indicated in Table 2 so that the total amount would become 40 g. With Labo Plastomill (manufactured by Toyo Seiki) set to 150° C., the mixture was melt-mixed for 5 minutes. Then, crosslinking agent was added in the proportions indicated in Table 2 and the mixing was continued for further 5 minutes. Then 12 μl of the crosslinking catalyst was added into the mixture, followed by farther melt-mixing to cause dynamic crosslinking. Thus-obtained thermoplastic elastomer composition could be easily molded to a sheet at 180° C.

COMPARATIVE EXAMPLE 5

The SIBS 2 prepared in Production Example 2 was melt-mixed for 10 minutes by Labo Plastomill (manufactured by Toyo Seiki) set to 180° C. and then, molded into a sheet at 180° C.

Each property of the sheets obtained in the above Examples 3 to 8 and Comparative Examples 5 is measured in accordance with the method mentioned above. The results are shown in Table 2.

TABLE 2

|  | Examples | | | | | | Comp. Ex. |
|---|---|---|---|---|---|---|---|
|  | 3 | 4 | 5 | 6 | 7 | 8 | 5 |
| SIBS2 (parts by weight) | 400 | 150 | 66 | 25 | 11 | 66 | 100 |
| APIB2 (parts by weight) | 100 | 100 | 100 | 100 | 100 | 100 | — |
| Plasticizer 1 (parts by weight) | — | — | — | — | — | 66 | — |
| Crosslinking agent 3 (parts by weight) | 1.2 | 1.2 | 1.2 | 1.2 | 1.2 | 1.2 | — |
| Crosslinking catalyst (μl) | 12 | 12 | 12 | 12 | 12 | 12 | — |
| Hardness (JIS A) | 50 | 46 | 42 | 38 | 37 | 17 | 46 |
| Tensile breaking strength (MPa) | 11.5 | 13.3 | 12.4 | 4.8 | 2.1 | 1.3 | 12.6 |
| Tensile elongation at break (%) | 560 | 630 | 620 | 550 | 330 | 360 | 520 |
| Permanent compression set (%) | 62 | 55 | 39 | 23 | 13 | 12 | 71 |
| tan δ (−30° C.) | — | — | 1.19 | — | 1.32 | — | 1.00 |
| tan δ (20° C.) | — | — | 0.39 | — | 0.41 | — | 0.44 |

As shown in Examples 3 to 7, it is found that the thermoplastic elastomer compositions show thermoplasticity, in wide composite range with maintained similar flexibility and vibration damping properties as isobutylene block copolymer SIBS used alone in Comparative Example 5. It is also found that permanent compression set is improved in Examples 3 to 7. Furthermore, it is found that, from the result of Example 8, addition of plasticizer enables to give a thermoplastic elastomer composition with higher flexibility and improved permanent compression set.

PRODUCTION EXAMPLE 4

Production of Modified Styrene-isobutylene-styrene Triblock Copolymer (ASIBS) having a Terminal alkenyl Group The polymerization vessel of a 2L separable flask was subjected to nitrogen purging, and using an injection syringe, 480 mL of n-hexane (dried with molecular sieves) and 690 mL of butyl chloride (dried with molecular sieves) were added. The polymerization vessel was cooled by immersion in a dry ice/methanol bath at −70° C. Then, a Teflon liquid delivery tube was connected to a pressure-resisting glass liquefaction sampling tube equipped with a 3-way cock and containing 201 mL (2132 mmol) of isobutylene monomer and the isobutylene monomer was delivered under nitrogen pressure to the polymerization vessel. Then, 2.6 g (11.2 mmol) of p-dicumyl chloride and 1.22 g (14 mmol) of N,N-dimethylacetamide were added, further followed by addition of 9.9 mL (90.0 mmol) of titanium tetrachloride. The reaction mixture was stirred at the same temperature for 1.5 hours after the start of polymerization and about 1 mL of the polymer slurry was withdrawn as a sample. Then, 52 g (499 mmol) of styrene monomer was added to the polymerization vessel. Forty-five minutes following addition of the styrene monomer, 12 ml (10.0 mmol) of allyltrimethylsilane was added. After 60-minute stirring at the temperature as it was, the reaction mixture was poured in to a large amount of water to terminate the reaction.

The resulting reaction mixture was washed with two portions of water. The solvent was distilled off from the reaction mixture, and the polymer thus obtained was dried in vacuo at 60° C. for 24 hours to recover the objective block copolymer. The molecular weight of this polymer was determined by gel permeation chromatography (GPC), and thereby the block copolymer obtained was found to have an Mw value of 22,500. Furthermore, the block copolymer contained 1.4 terminal ally groups per molecule.

EXAMPLE 9

The SIBS 1 prepared in Production Example 1 and ASIBS prepared in Production Example 4 were measured and formulated in the ratio indicated in Table 3 so that the total amount would become 40 g. With Labo Plastomill (manufactured by Toyo Seiki) set to 150° C., the mixture was melt-mixed for 5 minutes. Then, crosslinking agent was added in the proportions indicated in Table 3 and the mixing was continued for further 5 minutes. Then 25 μl of the crosslinking catalyst was added into the mixture, followed by further melt-mixing to cause dynamic crosslinking. Thus-obtained thermoplastic elastomer composition could be easily molded to a sheet at 180° C.

EXAMPLE 10

Except that the formulating level of SIBS 1 and ASIBS was changed, the procedure of Example 9 was otherwise repeated to cause dynamic crosslinking. The thermoplastic elastomer composition could be molded.

EXAMPLE 11

The SIBS 1 and ASIBS were formulated in the ratio indicated in Table 3 and the mixture was melt-mixed for 5 minutes with Labo Plastomill (manufactured by Toyo Seiki) set to 150° C. Subsequently, the plasticizer was added in the proportions indicated in Table 3 and the mixing was continued for 5 minutes. Then, crosslinking agent was added in the proportions indicated in Table 3 and the mixing was continued for further 5 minutes. Then crosslinking catalyst was added into the mixture, followed by further melt-mixing to cause dynamic crosslinking. Thus-obtained thermoplastic elastomer composition could be easily molded to a sheet at 180° C.

EXAMPLE 12

Except the formulating ratio of each component was changed, the procedure of Example 11 was otherwise repeated to mold a sheet.

COMPARATIVE EXAMPLE 6

After ten-minute melt-mixing of SIBS 1 prepared in Production Example 1 with Labo Plastomill (manufactured by Toyo Seiki) set to 180° C., the SIBS 1 was molded to a sheet.

COMPARATIVE EXAMPLE 7

The SIBS 1 and IIR were formulated in the ratio indicated in Table 3 and the mixture was melt-mixed for 5 minutes with Labo Plastomill (manufactured by Toyo Seiki) set to 180° C. Subsequently, the crosslinking agent 2, auxiliary crosslinking agent 1 and auxiliary crosslinking agent 2 were added in the proportions indicated in Table 3 and the melt-mixing for dynamic crosslinking was carried out at 180° C. until the torque value had reached a peak level (3 to 7 minutes). Thus-obtained thermoplastic elastomer composition could be easily molded to a sheet at 180° C.

COMPARATIVE EXAMPLE 8

With the ASIBS prepared in Production Example 4, the composition was prepared in the ratio indicated in Table 3, according to the similar way as Example 9. But it could not be molded to a sheet form with this composition.

COMPARATIVE EXAMPLE 9

By using Rabalon(R) SJ5400N (product of Mitsubishi Chemical), a sheet was molded.

Each property of the sheets obtained in the above Examples 9 to 12 and Comparative Examples 6, 7 and 9 is measured in accordance with the method mentioned above. The results are shown in Table 3.

TABLE 3

|  | Examples | | | | Comp. Examples | | | |
| --- | --- | --- | --- | --- | --- | --- | --- | --- |
|  | 9 | 10 | 11 | 12 | 6 | 7 | 8 | 9 |
| SIBS1 (parts by weight) | 100 | 67 | 60 | 40 | 100 | 100 | — | Rabalon SJ5400N (product of Mitsubishi Chemical) |
| ASIBS (parts by weight) | 100 | 100 | 100 | 100 | — | — | 100 | |
| IIR (parts by weight) | — | — | — | — | — | 100 | — | |
| Plastisizer 2 (parts by weight) | — | — | 60 | 100 | — | — | — | |
| Crosslinking agent 1 (parts by weight) | 9 | 9 | 9 | 9 | — | — | 9 | |
| Crosslinking agent 2 (parts by weight) | — | — | — | — | — | 10 | — | |
| Aux. crosslinking agent 1 (parts by weight) | — | — | — | — | — | 5 | — | |
| Aux. crosslinking agent 2 (parts by weight) | — | — | — | — | — | 1 | — | |
| Crosslinking catalyst (μl) | 25 | 25 | 25 | 25 | — | — | 25 | |
| Hardness (JIS A) | 56 | 66 | 38 | 22 | 50 | 35 | Not moldable to sheet | 50 |
| Tensile breaking strength (MPa) | 13 | 9 | — | — | 15.6 | 6.1 | | 8.5 |
| Tensile elongation at break (%) | 616 | 312 | — | — | 676 | 490 | | 764 |
| Permanent compression set (%) | 41 | 44 | 45 | 52 | 66 | 68 | | 23 |
| Transparency | Transparent | Transparent | Transparent | Transparent | Transparent | Opaque | | Opaque |
| tan δ (−30° C.) | 1.15 | — | — | — | 1.22 | — | | 0.2 |
| tan δ (20° C.) | 0.26 | — | — | — | 0.24 | — | | 0.09 |

The thermoplastic elastomer compositions of the invention are transparent and have a lower value of permanent compression set than that of isobutylene block copolymer SIBS as used alone in Comparative Example 6. Thus, they are superior in permanent compression set with the properties of isobutylene block copolymer maintained. Furthermore, it is apparent that, compared with the case shown in Comparable Example 7 in which IIR was used, the thermoplastic elastomer compositions shown in Example 11 and 12 are superior in permanent compression set, although the hardness thereof is similar or lower. It is also apparent that the thermoplastic elastomer composition of Example 9 has a high tan δ value and is superior in vibration damping properties.

INDUSTRIAL APPLICABILITY

As described above, the thermoplastic elastomer composition of the present invention is a novel thermoplastic elastomer which is highly flexible, and satisfactory in good moldability, rubber-like characteristics, mechanical strengths, permanent compression set characteristics and vibration damping properties, with isobutylene block copolymer maintained.

The invention claimed is:

1. A thermoplastic elastomer composition which comprises:
    an isobutylene block copolymer (A) containing a polymer block composed predominantly of isobutylene and a polymer block composed predominantly of an aromatic vinyl compound;
    an alkenyl-terminated isobutylene polymer (B); and
    a crosslinking agent (C);
    wherein the alkenyl-terminated isobutylene polymer (B) is crosslinked dynamically in melt-mixing of the isobutylene block copolymer (A) with the alkenyl-terminated isobutylene polymer (B), and the crosslinking agent (C) is a hydrosilyl group-containing compound.

2. The thermoplastic elastomer composition according to claim 1,
    wherein the alkenyl-terminated isobutylene polymer (B) is at least one polymer selected from the group consisting of (B-1) an alkenyl-terminated isobutylene homopolymer or an alkenyl-terminated isobutylene random copolymer, and (B-2) a modified alkenyl-terminated isobutylene block copolymer comprising a polymer block composed predominantly of isobutylene and a polymer block composed predominantly of an aromatic vinyl compound.

3. The thermoplastic elastomer composition according to claim 1,
    wherein the alkenyl-terminated isobutylene polymer (B) is an allyl-terminated polymer obtainable by substitution reaction of terminal chlorine atom of the isobutylene polymer with allyltrimethylsilane.

4. The thermoplastic elastomer composition according to claim 1,
    wherein the alkenyl-terminated isobutylene polymer (B) is crosslinked in a stage preceding the blending with isobutylene block copolymer (A).

5. The thermoplastic elastomer composition according to claim 1,
    wherein the block constituting the isobutylene block copolymer (A) is a triblock copolymer comprising a polymer block (a) composed predominantly of isobutylene and a polymer block (b) composed predominantly of an aromatic vinyl compound and having the structure represented as (b)-(a)-(b).

6. The thermoplastic elastomer composition according to claim 1,
    which further comprises a plasticizer (D).

7. The thermoplastic elastomer composition according to claim 6,
    wherein the plasticizer (D) is at least one selected from the group consisting of paraffinic mineral oil and naphthene mineral oil.

8. The thermoplastic elastomer composition according to claim 1,
    which further comprises a reinforcing material (E).

9. The thermoplastic elastomer composition according to claim 8, wherein the reinforcing material (E) is at least one selected from the group consisting of polystyrene, polyphenylene ether and mixture thereof.

10. The thermoplastic elastomer composition according to claim 1,
wherein the alkenyl-terminated isobutylene polymer (B) is a polymer having weight average molecular weight of 1,000 to 500,000 and containing at least 0.2 alkenyl groups per molecule at the molecular chain terminus.

11. The thermoplastic elastomer composition according to claim 1,
which comprises 5 to 1,000 weight parts of isobutylene block copolymer (A) per 100 weight parts of the alkenyl-terminated isobutylene polymer (B).

12. The thermoplastic elastomer composition according to claim 1,
which further comprises a plasticizer (D).

13. The thermoplastic elastomer composition according to claim 1,
which further comprises a reinforcing material (E).

14. The thermoplastic elastomer composition according to claim 6,
which further comprises a reinforcing material (E).

15. The thermoplastic elastomer composition according to claim 12,
which further comprises a reinforcing material (E).

* * * * *